United States Patent [19]

Shimazaki

[11] Patent Number: 4,722,593
[45] Date of Patent: Feb. 2, 1988

[54] LIQUID-CRYSTAL PROJECTOR WITH LIGHT BEAM REDUCTION LENS ARRAY FOR IMPROVED BRIGHTNESS OF IMAGE OUTER PORTIONS

[75] Inventor: Tatsuo Shimazaki, Tokyo, Japan

[73] Assignee: Casio Computer Co., Ltd., Tokyo, Japan

[21] Appl. No.: 880,803

[22] Filed: Jul. 1, 1986

[30] Foreign Application Priority Data

Jul. 29, 1985 [JP] Japan ................ 60-116189[U]

[51] Int. Cl.$^4$ .................... G02F 1/13; G03B 21/00
[52] U.S. Cl. .................. 350/336; 350/331 R; 350/339 F; 350/432; 353/69; 353/122
[58] Field of Search ........... 350/331 R, 336, 339 F, 350/432, 250; 353/122, 121, 38, 69, 30, 31

[56] References Cited

U.S. PATENT DOCUMENTS

| | | | |
|---|---|---|---|
| 2,787,935 | 4/1957 | Inoue | 353/122 |
| 4,060,316 | 11/1977 | Pollack et al. | 353/122 |
| 4,127,322 | 11/1978 | Jacobson et al. | 353/31 |
| 4,479,119 | 10/1984 | Sakano | 340/731 |
| 4,595,263 | 6/1986 | Clarke | 350/342 |
| 4,613,207 | 9/1986 | Fergason | 353/122 |
| 4,671,634 | 6/1987 | Kizaki et al. | 353/122 |

FOREIGN PATENT DOCUMENTS 2121210 12/1983 United Kingdom ............ 350/342

OTHER PUBLICATIONS

T. Uchida—"A Full-Color . . . Color Layers on the Electrodes", May 1983, pp. 503-507—IEEE Transactions on Electron Devices-vol. Ed. 30-No. 5.

*Primary Examiner*—Stanley D. Miller
*Assistant Examiner*—Tai V. Duong
*Attorney, Agent, or Firm*—Frishauf, Holtz, Goodman & Woodward

[57] ABSTRACT

A liquid-crystal projector reduces outer portions of a light beam corresponding to a projection image from a liquid-crystal display panel illuminated with light from a light source by a light beam width reduction lens array in order to increase the luminance of the outer beam portions. The projection image passing through the light beam width reduction lens array is compensated for attenuation in luminance of the outer beam portions, and is then projected onto a screen surface through a projection lens system.

6 Claims, 10 Drawing Figures

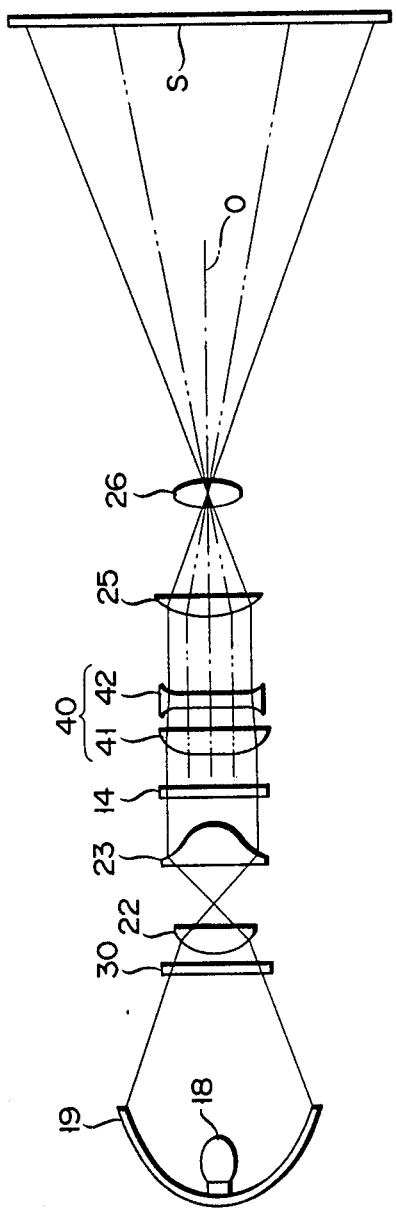
F I G. 3

LIQUID-CRYSTAL PROJECTOR WITH LIGHT BEAM REDUCTION LENS ARRAY FOR IMPROVED BRIGHTNESS OF IMAGE OUTER PORTIONS

BACKGROUND OF THE INVENTION

The present invention relates to an improvement of a liquid-crystal projector.

A liquid-crystal projector projects an image on a transmission type liquid-crystal display panel, and the image displayed on the liquid-crystal panel is enlarged and projected onto a screen surface. The liquid-crystal projector has the following arrangement.

FIG. 1 shows the schematic arrangement of a conventional liquid-crystal projector. Reference numeral 1 denotes a transmission type dot-matrix liquid-crystal panel; and 2, a light source lamp arranged behind panel 1. Light emitted from lamp 2 is reflected by reflector 3 and illuminates panel 1 from behind through condenser lens 4 and relay lens 5. Reference numeral 6 denotes a focusing lens arranged in front of panel 1; and 7, a projection lens. Light passing through panel 1, i.e., light beams corresponding to an image displayed on panel 1, is focused on projection lens 7 by focusing lens 6, and is enlarged thereby to be projected on the surface of screen S.

The liquid-crystal projector allows watching of an enlarged image displayed on a liquid-crystal display panel (e.g., a television image). With this projector, an image displayed on a liquid-crystal display panel having a small screen can be watched on a large screen.

However, since the liquid-crystal projector enlarges a displayed image on panel 1 using projection lens 7 and projects it onto the surface of screen S, the outer image portion projected on screen S has a lower brightness than that of the central image portion.

This is caused by a difference between optical path lengths from the respective portions of panel 1 to screen S. Since outer light beams propagating toward screen S through lens 7 have a longer optical path length than that of inner beams, the luminance of the outer light beams is greatly attenuated, thus darkening the outer image portion projected on screen S. This phenomenon is common in normal projectors which enlarge and project a film image onto a screen surface. However, in the normal projector, since the luminance of light is only slightly attenuated when it passes through a film, the above-mentioned phenomenon is not noticeable. In contrast to this, in the liquid-crystal projector, since light attenuation by the liquid-crystal display panel influences the brightness of the image projected on the screen, the above phenomenon is noticeable.

FIG. 2 shows the brightness of image A projected on the surface of screen S by the conventional liquid-crystal projector. Upper and lower portions Aa and Ab of image A are darker than the central portion thereof. Widths Wa and Wb of portions Aa and Ab each correspond to ¼ of total width W0 of image A. Note that FIG. 2 exemplifies a state wherein only upper and lower portions Aa and Ab of image A are darkened. However, such a phenomenon also occurs on the right and left side portions of the screen.

SUMMARY OF THE INVENTION

The present invention has been made in consideration of the above situation, and has as its object to provide a liquid-crystal projector for enlarging and projecting a displayed image on a liquid-crystal panel onto a screen surface using a projection lens, which can brighten an outer image portion on the screen surface and which can obtain a uniform screen brightness.

In order to achieve the above object of the present invention, there is provided a liquid-crystal projector, comprising: light source means; liquid-crystal display panel means which is illuminated with light emitted from the light source means and in which an image displayed thereon is enlarged and projected onto a screen surface; light beam width reduction lens means which reduces the widths of outer portions of the light beam corresponding to the image displayed on the liquid-crystal display panel means in order to increase an optical density of these outer portions of the light beam; and projection lens means, arranged along the optical axis of the liquid-crystal display panel means, the light beam width reduction lens means, and the screen, for enlarging the image passing through the light beam width reduction lens means and projecting it onto the screen surface.

With this arrangement of the liquid-crystal projector of the present invention, the widths of the outer portions of the light beam propagating from the liquid-crystal display panel toward the projection lens are reduced to increase the luminance thereof. Therefore, when an image displayed on the liquid-crystal display panel is enlarged by the projection lens, a screen image of uniform brightness can be obtained.

BRIEF DESCRIPTION OF THE DRAWINGS

FIG. 3 is a schematic view of an optical system of a liquid-crystal projector according to an embodiment of the present invention;

DETAILED DESCRIPTION OF THE PREFERRED EMBODIMENTS

Figure 1:
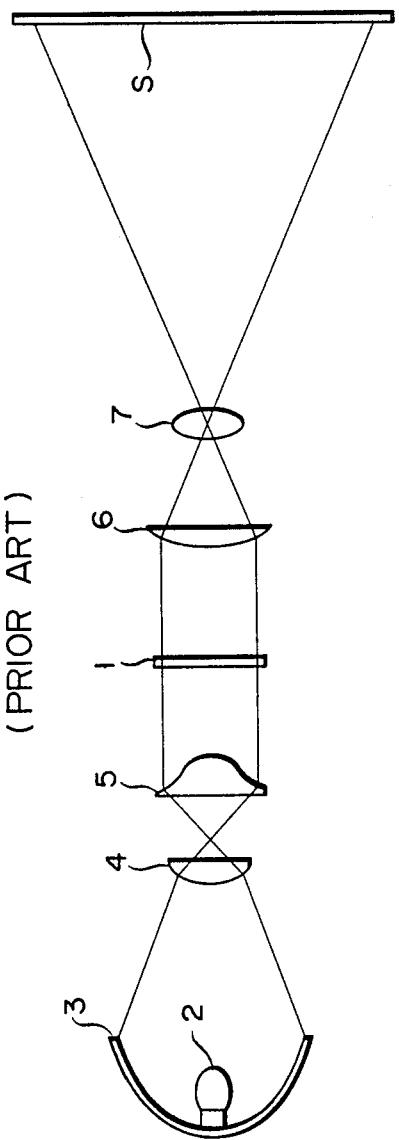
FIG. 1 is a schematic view of an optical system of a conventional liquid-crystal projector.
Figure 2:
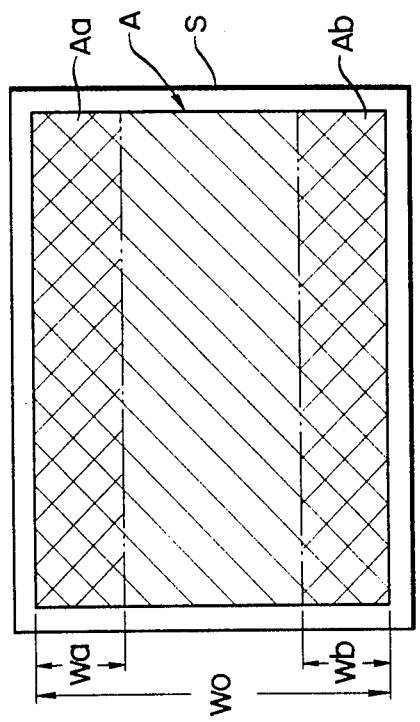
FIG. 2 is a front view of a screen for explaining variations in luminance of an image projected on the screen.
Figure 4:
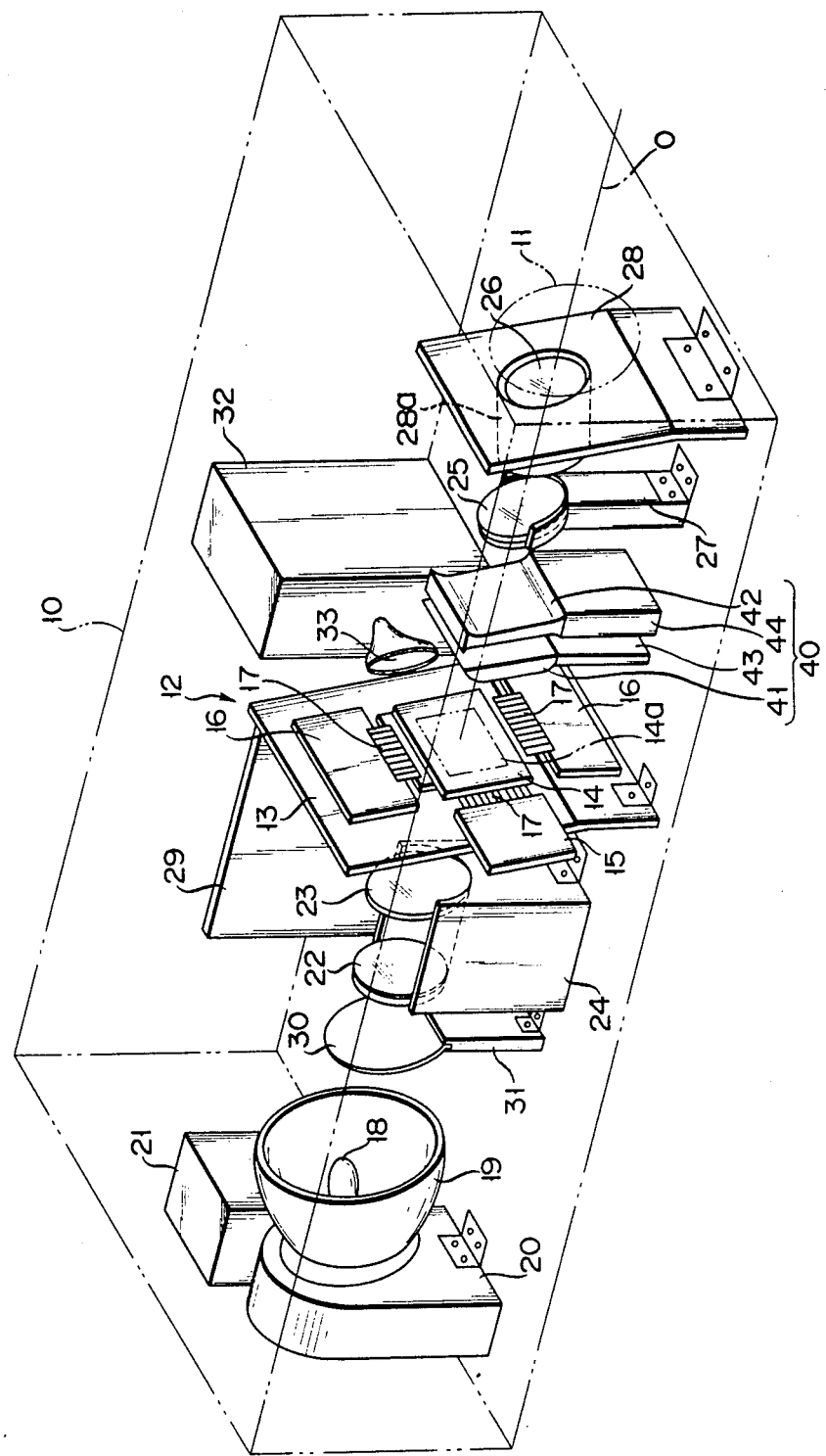
FIG. 4 is a detailed perspective view of the liquid-crystal projector according to the embodiment of the present invention.

Referring to FIGS. 3 and 4, reference numeral 10 denotes a projector case. Projection window 11 is formed in the front surface of case 10.

Reference numeral 12 denotes a liquid-crystal display unit arranged in case 10. In unit 12, TN transmission type dot-matrix liquid-crystal display panel 14 is arranged on support plate 13, which vertically projects from the bottom surface of case 10, to oppose projection window 11. A total of two liquid-crystal display panel drive circuit boards 15 and 16 are arranged on support plate 13 at one side and at upper and lower sides, respectively, of panel 14. Circuit board 15 arranged at one side of panel 14 serves as a scanning electrode drive circuit board for driving scanning electrodes of panel 14, and circuit board 16 arranged at the upper and lower sides of panel 14 serves as signal electrode drive circuit boards for driving signal electrodes of panel 14. Circuit boards 15 and 16 are respectively connected to a terminal array section of panel 14 through film-like heat-seal connector 17. Note that an opening (not shown) slightly larger than display screen 14a of panel 14 is formed in the display panel mounting portion of support plate 13.

Reference numeral 18 denotes a light source lamp arranged in the rear portion of case 10; and 19, a reflector, on the inner surface of which a cold mirror is formed. Light source lamp 18 and reflector 19 are arranged on lamp mounting base 20, which incorporates a lamp cooling fan. Lamp 18 comprises a halogen or Xenon lamp to be as bright as possible. Note that reference numeral 21 denotes a lamp power source unit.

Reference numeral 22 denotes a condenser lens arranged between lamp 18 and panel 14; and 23, a relay lens (non-spherical lens) arranged between lens 22 and panel 14. Lenses 22 and 23 are mounted on lens support base 24 fixed to the bottom surface of case 10. Reference numeral 25 denotes a focusing lens arranged in front of panel 14; and 26, a projection lens arranged in front of lens 25. Lens 25 is mounted on lens support base 27 fixed to the bottom surface of case 10, and lens 26 is arranged in mirror cylinder 28a provided on lens mounting plate 28, which vertically projects from the bottom surface of case 10.

Reference numeral 29 denotes a linear circuit board provided in case 10. Circuit board 29 is connected to en-circuit boards 15 and 16 of unit 12 through cables (not shown). Circuit board 29 is also connected to a receiver unit including a television signal reception circuit, a voice amplifier circuit, a speaker, and the like (although not shown, this unit can be arranged inside case 10, or can be arranged separately from the projector).

Reference numeral 30 denotes an ultraviolet absorption filter arranged between lamp 18 and panel 14 (e.g., between lamp 18 and lens 22). Filter 30 is mounted on filter mounting plate 31 vertically projecting from the bottom surface of case 10.

Reference numeral 32 denotes a liquid-crystal panel cooling device arranged at one side of unit 12 inside case 10. Cooling device 32 has a housing having an intake port open to the outside of case 10, and a blowing fan (not shown) arranged in the housing. Low-profile cooling air outlet duct 33, for blowing cooling air supplied from the fan toward the side portion of panel 14 of unit 12, is formed in the front surface of the housing of device 32, which faces unit 12.

Figure 5A:
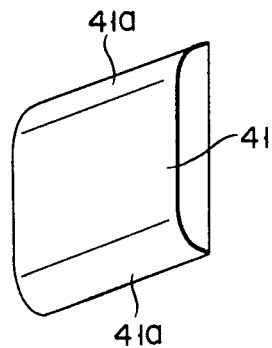
FIGS. 5A and 5B are respectively perspective views of first and second lenses constituting a light beam width reduction lens means used in the projector of the present invention.
Figure 5B:
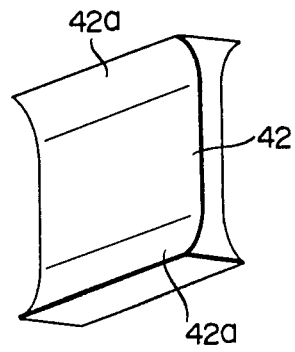

Reference numeral 40 denotes a light beam width reduction lens array arranged between panel 14 and projection lens 26 (in this embodiment, between panel 14 and lens 25). Lens array 40 consists of lens body 41 having upper and lower convex lens portions 41a (FIG. 5A), and lens body 42 having upper and lower concave lens portions 42a (FIG. 5B). The central portions of lens bodies 41 and 42 are flat, and the upper and lower portions thereof are formed to obtain lens curves, as shown in FIGS. 5A and 5B. Convex lens portion 41a of lens body 41 has a focusing effect for reducing the widths of the outer portions (upper and lower portions) of a light beam propagating from panel 14 toward lens 26. Concave lens portion 42a of lens body 42 makes the light beam deflected by the focusing effect of lens portions 41a parallel to optical axis O. Note that in FIG. 4, reference numerals 43 and 44 denote lens supporting bases fixed to the bottom surface of case 10. Lens bodies 41 and 42 are respectively supported by bases 43 and 44.

Liquid-crystal display panel 14 of unit 12 is inclined at correct angle of field $\theta$ (about 10° to 20°) with respect to optical axis O connecting the center of panel 14 and that of screen S, so that direction a of correct angle of field $\theta$ of panel 14 is directed toward the surface of screen S (i.e., direction a of panel 14 coincides with optical axis O). In addition, lenses 25, 26, 41, and 42 are inclined to be parallel to panel 14.

In the liquid-crystal projector of the present invention, a television image is displayed on panel 14, and is enlarged by projection lens 26 to be projected onto the surface of screen S. Illumination light emitted from lamp 18 and reflected by reflector 19 passes through filter 30, as shown in FIG. 3, to remove an ultraviolet component therefrom, and then illuminates panel 14 from behind through lenses 22 and 23. The light passing through panel 14, i.e., the light beam corresponding to the image displayed on panel 14, first passes through lens array 40 to decrease the widths of the upper and lower portions thereof. Thereafter, the light beam is focused on projection lens 26 by lens 25, and is enlarged thereby to be projected onto the surface of screen S.

Figure 9:
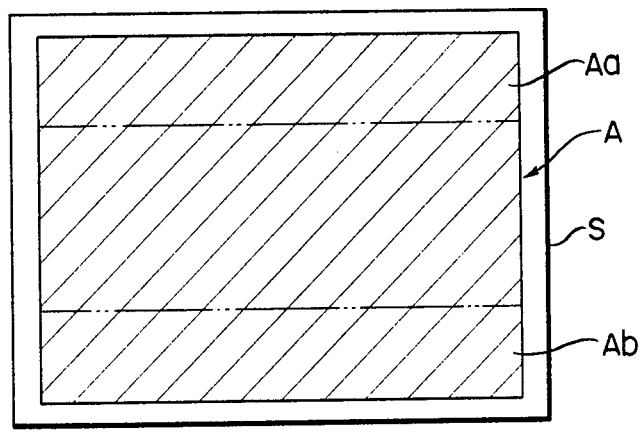
FIG. 9 is an illustration of an image projected on a screen by the projector of the present invention.

In this projector, since the widths of the upper and lower portions of the light beam propagating from panel 14 toward lens 26 are reduced by lens array 40 as described above, the optical density of the upper and lower beam portions is increased, thereby increasing the luminance of these portions. Therefore, with this projector, while the image displayed on panel 14 is enlarged by lens 26 and is projected onto the surface of screen S, even if the luminance of the upper and lower beam portions is greatly attenuated, the attenuation in luminance can be compensated for by an increase in luminance by means of beam width reduction. For this reason, image A projected onto the surface of screen S can have an entirely uniform brightness (i.e., upper and lower portions Aa and Ab are as bright as the central portion), as shown in FIG. 9.

In the projector of the present invention, the widths of the upper and lower beam portions propagating from panel 14 toward lens 26 can be reduced. Thus, if a conventional liquid-crystal display panel is used as panel 14, although the luminance is increased, the widths of portions Aa and Ab of image A (FIG. 9) are also reduced, thus vertically distorting images corresponding to portions Aa and Ab.

However, in this embodiment, an image, upper and lower portions of which are expanded vertically, is displayed on panel 14. Therefore, when this image is reduced by lens array 40, it can be a normal size proportion.

Figure 6:
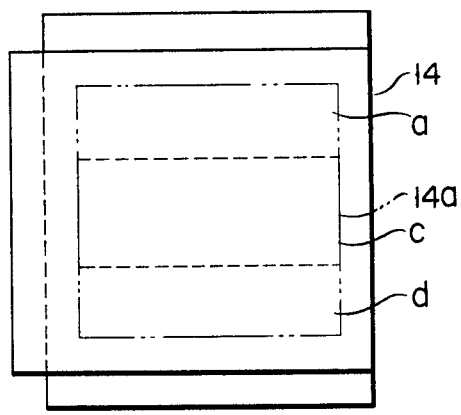
FIG. 6 is a front view of a liquid-crystal display panel used in the projector of the present invention.

More specifically, FIG. 6 shows display screen 14a of panel 14. A normal image is displayed on central portion c of screen 14a, while vertically expanded images are displayed on upper and lower portions a and b.

Figure 7:
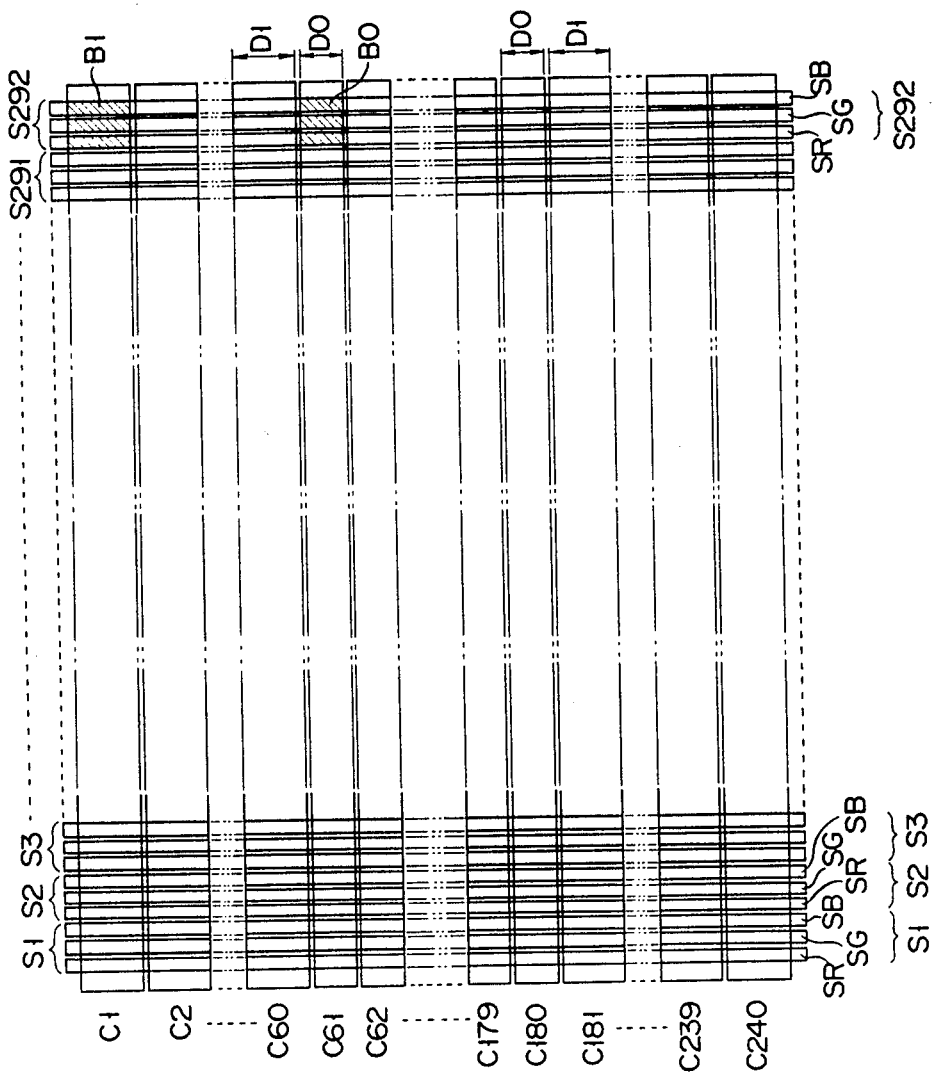
FIG. 7 is an electrode pattern of the panel shown in FIG. 5 according to an embodiment of the present invention.

FIG. 7 illustrates display electrodes of panel 14, (in this case, the electrode pattern of a color liquid-crystal display panel). In FIG. 7, reference numerals C1 to C240 denote scanning electrodes (common electrodes) formed on one substrate of panel 14; and S1 to S292, signal electrodes (segment electrodes) formed on the other substrate thereof. Each of signal electrodes S1 to S292 consists of three elongated electrodes, i.e., red, green, and blue display electrodes SR, SG, and SB on which corresponding color filters are formed.

Of the 240 scanning electrodes C1 to C240 aligned vertically, widths D1 of the upper 60 scanning electrodes C1 to C60 (¼ the total number of the scanning electrodes) and the lower 60 scanning electrodes C181 to C240 are larger than widths D0 of central scanning electrodes C61 to C180 (e.g., about 1.5 times). Width D0 is substantially equal to the width of each of signal electrodes S1 to S292 consisting of combinations of three electrodes SR, SG, and SB. Therefore, pixels B0 displayed on intersections of central scanning electrodes C61 to C180 and signal electrodes S1 to S292 have a square shape (i.e., a ratio of the vertical and horizontal sizes of 1 : 1). Pixels B1 displayed on intersections of upper and lower scanning electrodes C1 to C60 and C181 to C240 have a vertically expanded rectangular shape. Therefore, images displayed on upper and lower portions a and b of screen 14a of panel 14 in FIG. 6 are vertically expanded.

When the liquid-crystal display panel of this embodiment is used as panel 14 of the liquid-crystal projector, if the upper and lower portions of the light beam propagating from panel 14 toward lens 26 are reduced by lens array 40, the upper and lower image portions can be a normal size. Therefore, image portions corresponding to upper and lower portions Aa and Ab of image A will not be vertically reduced, and a good image without distortion can be projected onto the surface of screen S.

Figure 8:
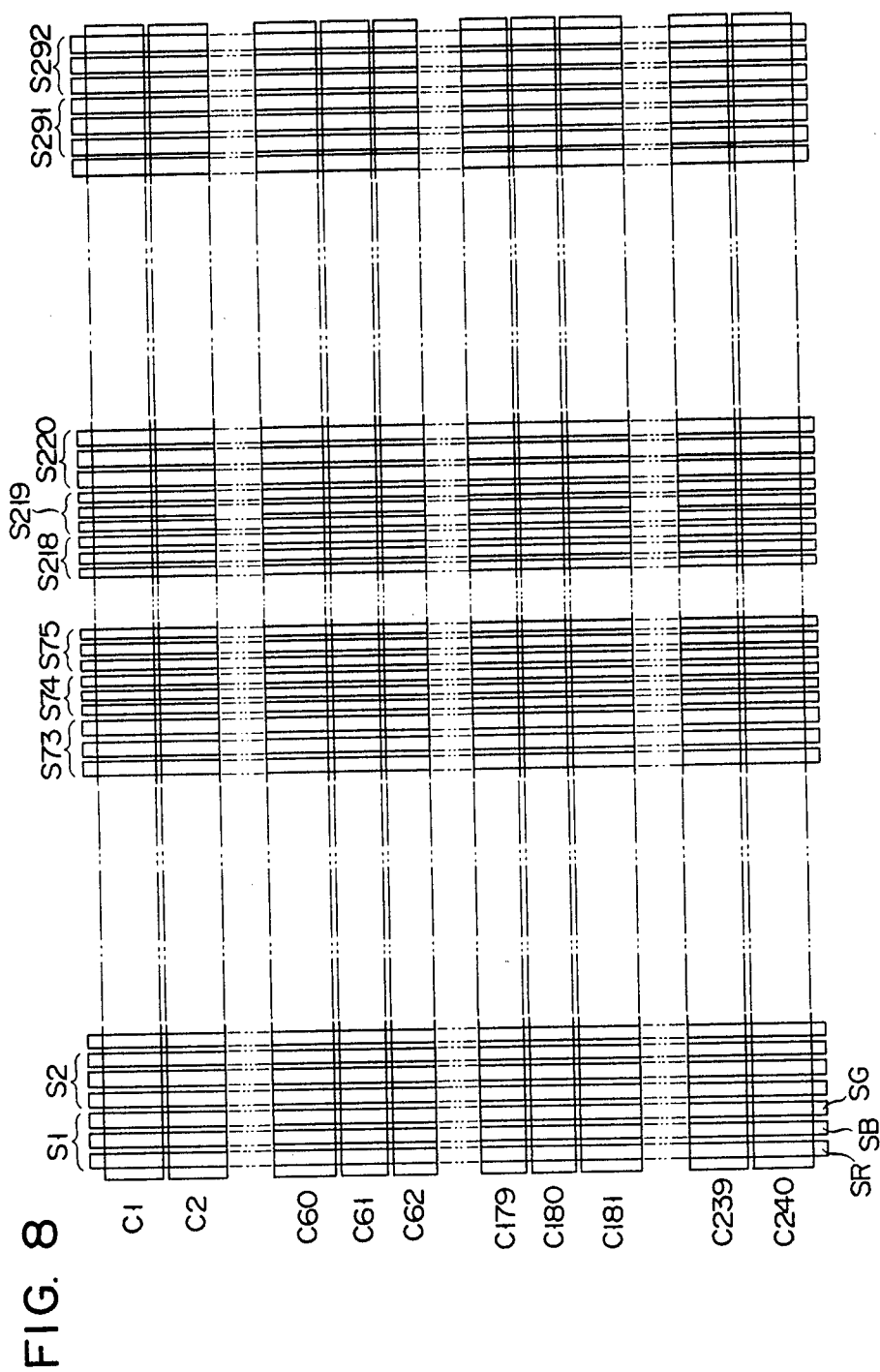
FIG. 8 is an electrode pattern of the panel shown in FIG. 5 according to another embodiment of the present invention.

In the above embodiment, a liquid-crystal projector which allows the brightness of upper and lower portions Aa and Ab of image A to be substantially equal to that of the central portion thereof has been exemplified. When the brightness of right and left portions of an image projected on the screen is also attenuated, a function for reducing widths of right and left beam portions can be provided to lens array 40 (i.e., lens bodies 41 and 42 have upper, lower, right, and left lens portions 41a and 42a). In addition, the widths of the predetermined number (determined in accordance with the widths of beam portions to be reduced) of right and left electrodes of signal electrodes S1 to S292 of panel 14 can be larger than those of the central electrodes, as shown in FIG. 8.

In the above embodiment, lens array 40 is constituted by lens bodies 41 and 42. However, lens array 40 can comprise a single lens. Alternatively, the radius of curvature of focusing lens 25 can be changed, and lens 25 can also serve as a light beam width reduction lens.

In addition, in the above embodiment, a color liquid-crystal display panel is used as panel 14. The present invention can also be applied to a liquid-crystal projector using a monochrome liquid-crystal display panel for projecting a monochrome image onto a screen surface. The present invention is not limited to a liquid-crystal projector which projects a television image onto a screen surface, but can be applied to a monitor projector for a VTR (video tape recorder), a projector type game machine for enlarging and projecting an image displayed on a liquid-crystal display panel, and the like.

Moreover, in the above embodiment, in order to prevent the outer portions of an image projected on the screen from being vertically reduced, panel 14 for expanding the outer image portions is adopted. However, when the distortion of the outer image portions is negligible, a normal liquid-crystal display panel can be adopted.

What is claimed is:

1. A liquid-crystal projector comprising:
   light source means;
   liquid-crystal display panel means which is illuminated with light emitted from said light source means and in which an image displayed thereon is enlarged and projected onto a screen surface;
   light beam width reduction lens means which reduces the widths of outer portions of the light beam corresponding to the image displayed on said liquid-crystal display panel means in order to increase an optical density of the outer portions of the light beam; and
   projection lens means, arranged along the optical axis of said liquid-crystal display panel means, said light beam width reduction lens means, and said screen, for enlarging the image passing through said light beam width reduction lens means and projecting it onto said screen surface.

2. A projector according to claim 1, wherein said liquid-crystal display panel means comprises a first substrate on which scanning electrodes for holding liquid crystals are aligned, and a second substrate on which signal electrodes are aligned; widths of upper and lower scanning electrodes, each corresponding in number to substantially 1/n the total number of said scanning electrodes aligned in the row direction, are substantially m times those of central scanning electrodes corresponding in number to substantially (1−2/n) the total number of said scanning electrodes; each of said signal electrodes consists of three elongated electrodes, i.e., a red display electrode on which a red filter is formed, a green display electrode on which a green filter is formed, and a blue display electrode on which a blue filter is formed; and the total width of said three elongated electrodes is substantially equal to that of each of said central scanning electrodes.

3. A projector according to claim 2, wherein n of 1/n is 4, and m is 1.5.

4. A projector according to claim 1, wherein said liquid-crystal display panel means comprises a first substrate on which scanning electrodes for holding liquid crystals are aligned, and a second substrate on which signal electrodes are aligned; widths of upper and lower scanning electrodes, each corresponding in number to substantially 1/n the total number of said scanning electrodes aligned in the row direction, are substantially m times those of central scanning electrodes corresponding in number to substantially (1−2/n) the total number of said scanning electrodes; each of said signal electrodes consists of three elongated electrodes, i.e., a red display electrode on which a red filter is formed, a green display electrode on which a green filter is formed, and a blue display electrode on which a blue filter is formed; widths of left and right signal electrodes, each corresponding in number to substantially 1/s the total number of said signal electrodes aligned in the column direction, are substantially p times those of central signal electrodes corresponding in number to substantially (1−2/s) the total number of said signal electrodes; and the total width of said three elongated electrodes is substantially equal to a width of each of said central scanning electrodes.

5. A projector according to claim 4, wherein s of 1/s is 4, and p is 1.5.

6. A projector according to claim 1, wherein said light beam width reduction lens means comprises a first lens body having upper and lower convex lens portions and a second lens body having upper and lower concave lens portions, which are aligned along said optical axis.

* * * * *